Oct. 8, 1946.　　　W. R. COREY　　　2,409,018
WARNING SIGNAL
Filed Aug. 14, 1945
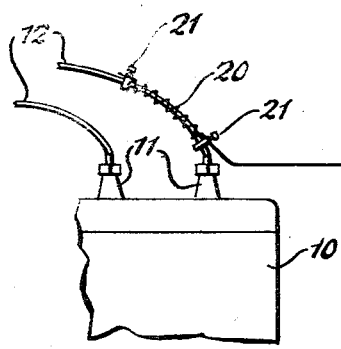
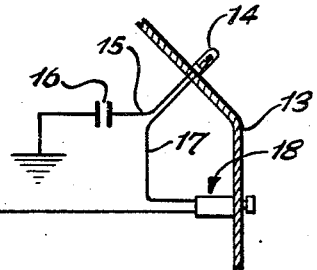
Fig. 1.
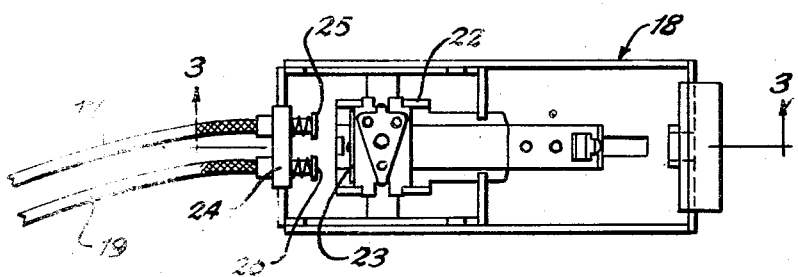
Fig. 2.
Fig. 3.
*Inventor*
Warner R. Corey.
By Clarence A. O'Brien
and Harvey B. Jacobson
*Attorneys*

Patented Oct. 8, 1946

2,409,018

UNITED STATES PATENT OFFICE 2,409,018

WARNING SIGNAL

Warner R. Corey, Inkster, Mich.

Application August 14, 1945, Serial No. 610,837

2 Claims. (Cl. 177—311)

This invention relates to a warning signal, and has for its primary object to notify an aviator or the driver of a motor vehicle when his navigation or driving lights should be turned on.

Another object is to produce such an emphatic warning that its neglect will create an unpleasant reaction to the aviator or driver of the vehicle, to such an extent that he will be compelled to heed the signal and turn on the navigation or driving lights, as the case may be.

Among its features, my invention embodies a lamp mounted in the vicinity of the instrument board of a vehicle having driving or navigation lights, means to establish communication between the lamp and a source of pulsating energy capable of illuminating the lamp, and a coincidental switch associated with the navigation or driving light and so arranged that when the navigation or driving lights are turned off, the lamp on the instrument board will be turned on and when the navigation or driving lights are turned on, contact will be broken through the energizing circuit of the lamp.

The signal hereinafter referred to is primarily designed for notifying the driver of a vehicle, whether it be aircraft or a road vehicle, when the degree of darkness is such as to require the use of the vehicle's navigation or driving light so as to contribute to the safe conduct of the vehicle on its course. It is not infrequent to see a moving vehicle in operation after dusk, or even after dark with the proper navigation or driving lights unilluminated.

Another important object of this invention is to create in the eyes of the navigator or driver of the vehicle an annoying series of light flashes which, while normally invisible in daylight, become increasingly visible as darkness descends, so as to bring about a condition which compels the aviator or driver of the vehicle to turn on his navigation or driving lights in order to remove the annoyance.

In the drawing—

Figure 1 is a diagrammatic view illustrating this improved warning signal applied to the instrument board of a vehicle and connected to the ignition system of the vehicle engine from which the warning lamp derives its source of power.

Figure 2 is a plan view of one type of coincidental switch which may be used in conjunction with this invention, and Figure 3 is a longitudinal sectional view taken substantially on the line 3—3 of Figure 2.

Referring to the drawing in detail, I have illustrated in Figure 1 an engine block 10 carrying the usual spark plugs 11 to which high tension leads 12 extend from the usual distributor in the conventional manner. Mounted on the instrument board 13 of the vehicle is a gaseous discharge lamp 14, one terminal 15 of which leads through a suitable condenser 16 to ground. The opposite terminal of the lamp 14 is connected through a wire 17 to a coincidental switch designated generally 18 arranged to control the navigation or driving lights of the vehicle in the conventional manner. Leading from the switch 18 is a conductor 19 which terminates in a series of spiral loops 20 extending around one of the lead wires 12 and held in proper position thereon by means of suitable clamps 21. The windings 20 serve as a pickup coil and function to collect the leakage current around the cable 12 in much the same manner as the "pickup coil 10" described in Patent No. 2,322,703, issued June 22, 1943, to Herbert S. Polin. It is obvious that by connecting the lamp to a single cable 12, it will flash only at such time as that particular cable is energized, with the result that a periodically flashing signal will result on the instrument board of the vehicle directly before the eyes of the operator. Should it be found desirable, it is also obvious that a second coil may be wound about a different spark plug cable 12 so that two or more cables may be utilized to energize the lamp and produce varying flashing effects. In fact, where a multicylinder engine is used or several multi-cylinder engines are used, it is possible to so connect the lamp 14 as to produce an almost constant glow. However, for most purposes, and in fact, to secure the most satisfactory results, I find it desirable to employ only one such coil so as to produce an intermittently flashing signal in the eyes of the operator.

In order to render a conventional switch 18 useful as a coincidental switch for my purpose, I find it advantageous to rivet or otherwise attach to the conventional sliding switch block 22 of the switch 18 a bridging contact plate 23. This plate is preferably of a good electrical conducting material, such as copper, and has no connection whatsoever with any part of the navigation or headlight control members other than its attachment to the insulated block 22, for movement therewith. Mounted in one end of the frame of the switch 18 is an insulating block 24 carrying a pair of spaced spring pressed contact members 25 and 26 which are held in such position that when the block 22 is moved to move the light controlling contacts to off position, the plate 23 will be moved into contact with the contacts 25 and 26 so as to establish electrical communication between the conductors 17 and 19, respectively. The switch 18 herein referred to is of a conventional type commonly employed on one of the popular brands of motor vehicles and it is to be understood that any other type of such a switch may be modified so as to suitably establish contact between the conductors 17 and 19 when the vehicle navigation or driving lights are out.

The operation of the device is more or less obvious, as it will be readily understood that when the driving lights or navigation lights of the vehicle are out, contact is established between the conductors 19 and 17 so that current will flow from the coil 20 through the conductor 19, contact 26, bridge plate 23 to the contact 25, and thence through the conductor 17 to the lamp 14 and the circuit is completed through the conductor 15 and condenser 16 to ground so that the lamp will periodically flash in unison with the energization of the spark plug to the lead of which the coil 20 is applied. Under ordinary daylight conditions, the flashing of the lamp on the instrument board 13 will produce no irritating effect, but as the day wanes and darkness replaces the light, the flashing of the lamp 14 will become increasingly visible to a point where it becomes a positive annoyance to the operator of the vehicle and he will thus be warned that it is time to turn on the navigation or driving lights of the vehicle, and due to the coincidental features of the switch 18, the flow of current to the lamp 14 will be interrupted with the turning on of the navigation or driving lights, as the case may be.

While in the foregoing there has been shown and described the preferred embodiment of this invention, it is to be understood that minor changes in the details of construction and combination and arrangement of parts may be resorted to without departing from the spirit and scope of the invention as claimed.

What is claimed is:

1. The combination with a vehicle having driving or navigation lights, an instrument board and an electric ignition system for its engine, of a glow discharge lamp mounted in the vicinity of the instrument board, means associated with the ignition system and connected to the glow discharge lamp to energize the latter when the engine is in operation, and means to interrupt the flow of energy through the lamp when the driving or navigation lights of the vehicle are turned on.

2. The combination with a vehicle having driving or navigation lights, an instrument board and an electric ignition system for its engine, of a glow discharge lamp mounted in the vicinity of the instrument board, means associated with the ignition system and connected to the glow discharge lamp to energize the latter when the engine is in operation, and a switch operable coincidental with the switch controlling the driving or navigation lights automatically to discontinue the flow of energy through the glow discharge lamp when the driving or navigation lights are turned on.

WARNER R. COREY.